US007313316B2

(12) United States Patent
Winter

(10) Patent No.: US 7,313,316 B2
(45) Date of Patent: Dec. 25, 2007

(54) METHOD AND APPARATUS FOR EVALUATING FOR THE PURPOSE OF DECODING A BITSTREAM HAVING A DATA STRUCTURE FULFILLING THE REQUIREMENTS OF TWO DIFFERENT DATA STRUCTURE STANDARDS, AND STORAGE MEDIUM CONTAINING SUCH BITSTREAM

(75) Inventor: Marco Winter, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 980 days.

(21) Appl. No.: 10/381,642

(22) PCT Filed: Sep. 14, 2001

(86) PCT No.: PCT/EP01/10619

§ 371 (c)(1),
(2), (4) Date: Mar. 26, 2003

(87) PCT Pub. No.: WO02/27726

PCT Pub. Date: Apr. 4, 2002

(65) Prior Publication Data
US 2004/0028387 A1 Feb. 12, 2004

(30) Foreign Application Priority Data
Sep. 27, 2000 (EP) ................... 00250321

(51) Int. Cl.
*H04N 7/00* (2006.01)
*H04N 5/00* (2006.01)
*H04N 5/91* (2006.01)
*G11B 5/09* (2006.01)
*G11B 7/24* (2006.01)

(52) U.S. Cl. .......... 386/95; 386/98; 386/125; 369/47.15; 369/275.3

(58) Field of Classification Search ............ 386/95, 386/98, 111, 125, 126; 369/30.04, 47.15, 369/275.3
See application file for complete search history.

(56) References Cited

U.S. PATENT DOCUMENTS 6,377,518 B1 * 4/2002 Auwens et al. .......... 369/30.04
2002/0005448 A1 * 1/2002 Sumiyashiki ............ 242/383.2

FOREIGN PATENT DOCUMENTS

EP 0 944 087 9/1999

(Continued)

OTHER PUBLICATIONS

Search Report.

*Primary Examiner*—Thai Q. Tran
*Assistant Examiner*—Syed Y. Hasan
(74) *Attorney, Agent, or Firm*—Joseph J. Laks; Robert B. Levy

(57) ABSTRACT

There are different types of DVD systems, e.g. the replay-only DVD-Video system and the re-recordable DVD-VR system. A DVD-VR type disc containing a DVD-VR type bitstream is to be replayed on a DVD-VR type recorder or player. However, it is also possible to record a DVD-Video type bitstream on a DVD-VR type disc in a DVD-VR type recorder, for replay of that disc in a DVD-Video type player. Because the DVD-VR and DVD-Video formats are different and contain different content they are not compatible with each other and a disc containing a bitstream of the one type can not be replayed on a player of the other type, a user must make a choice of which type of bitstream recording on a disc. One solution to this problem would be to record a separate disc for each type of bitstream. According to the invention a special type of bitstream is assembled and recorded on a disc that can be replayed on both types of players. This special type of bitstream is compatible with the DVD-Video system as well as the DVD-VR system. For both systems, corresponding additional files are added to their specific directories, but the resulting bitstream for both system types represents the same identical file on the disc. A disc containing a bitstream having such data structure can be replayed on both, DVD-VR and DVD-Video players.

6 Claims, 2 Drawing Sheets

FOREIGN PATENT DOCUMENTS

Figure 1:
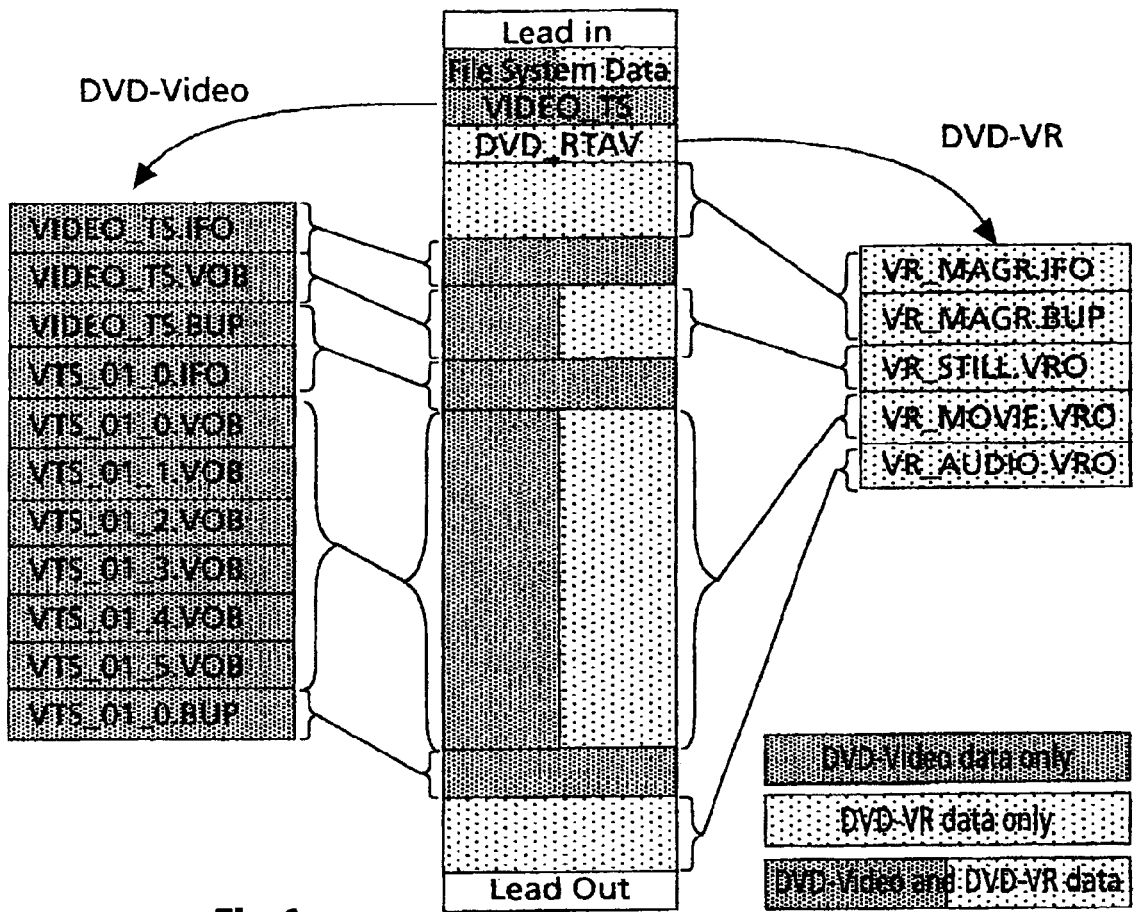

| WO | 00/02195 | 1/2000 |
| WO | 00/30112 | 5/2000 |
| WO | 00/30113 | 5/2000 |
| WO | 01/01415 | 1/2001 |

* cited by examiner

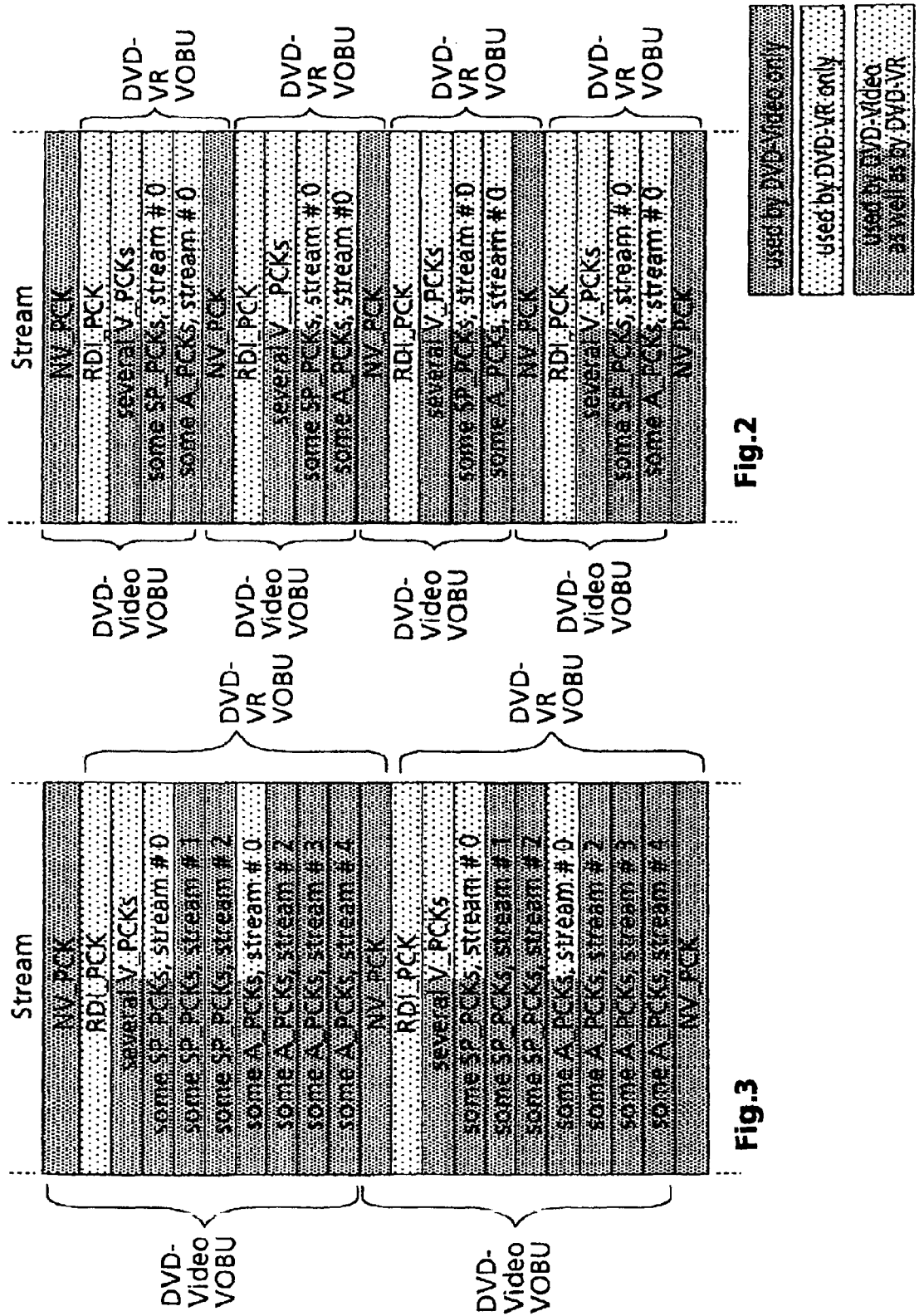

METHOD AND APPARATUS FOR EVALUATING FOR THE PURPOSE OF DECODING A BITSTREAM HAVING A DATA STRUCTURE FULFILLING THE REQUIREMENTS OF TWO DIFFERENT DATA STRUCTURE STANDARDS, AND STORAGE MEDIUM CONTAINING SUCH BITSTREAM

This application claims the benefit under 35 U.S.C. 365 of International Application PCT/EP01/10619, filed Sep. 14, 2001, which claims the benefit of European Patent Application No. 00250321.7, filed Sep. 27, 2000.

The invention relates to a method and to an apparatus for evaluating for the purpose of decoding a bitstream having a data structure fulfilling the requirements of two different data structure standards, and relates to a compatible storage medium containing such bitstream and to a method for compatibly assembling such bitstream.

BACKGROUND

There are different types of DVD (digital versatile disc) systems, for instance the replay-only DVD-Video system and the re-recordable DVD-VR system. DVD-Video is specified in: DVD Specification for Read-Only Disc, Part 3, Video Specifications, Version 1.0, August 1996.

DVD-VR is specified in: DVD Specification for Rewritable/Re-recordable Discs, Part 3, Video Recording, Version 1.0, September 1999.

The corresponding bitstreams have different formats and different content.

WO-A-00 02195 discloses a DVD compatible with the DVD-Video standard and the DVD-RTR standard. The contents data is stored in separate directories and files.

EP-A-0 944 087 shows a DVD containing audio/video information and audio information, wherein for each type of player different navigation information is recorded for the same object.

INVENTION

A DVD-VR type disc containing a DVD-VR type bitstream is to be replayed on a DVD-VR type recorder or player. However, it is also possible to record a DVD-video type bitstream on a DVD-VR type disc in a DVD-VR type recorder, for replay of that disc in a DVD-Video type player.

Because the DVD-VR and DVD-Video formats are not compatible with each other and a disc containing a bitstream of the one type can not be replayed on a player of the other type, a user must make a choice of which type of bitstream recording on a disc.

One solution to this problem would be to record a separate disc for each type of bitstream.

The problem to be solved by the invention is to make the required processing easier in order to free a user from the decision about which type of bitstream is to be recorded. This problem is solved by the method disclosed in claim 1. An apparatus that utilises this method is disclosed in claim 7. A storage medium containing a corresponding bitstream is disclosed in claim 11.

According to the invention a special type of bitstream is assembled and recorded on a disc that can be replayed on both types of players. This special type of bitstream is compatible with the DVD-Video system as well as the DVD-VR system. The reason for this compatibility is that the header of a data pack contains an information about the type of data contained in the payload of the pack. A data type unusable for, or unknown to, a specific type of player is not evaluated by that type of player. For both systems, corresponding additional files are added to their specific directories, but the resulting bitstream for both system types represents the same identical file on the disc.

A disc containing a bitstream having the inventive data structure can be replayed by both, DVD-VR and DVD-Video players. Even first-generation DVD players can replay such discs.

In principle, the inventive method is suited for evaluating for the purpose of decoding a bitstream having a data structure fulfilling the requirements of a first data structure standard, the data of which bitstream include first main overhead data and multiple data units, each data unit containing first data unit overhead data according to said first data structure standard and encoded video data and encoded or non-encoded audio data, wherein:

- said bitstream additionally includes second main overhead data such that said data structure of said bitstream fulfills also the requirements of a second data structure standard that is different from said first data structure standard;
- said data units additionally contain second data unit overhead data according to said second data structure standard;
- said encoded video data and said encoded or non-encoded audio data are common to said first and second data structure standards;
- when inputting said bitstream to a device operating on the basis of said first data structure standard, evaluating said first main overhead data and said first data unit overhead data of said data units, and decoding said encoded video data and decoding or processing, respectively, said encoded or non-encoded audio data, but not evaluating said second main overhead data and said second data unit overhead data of said multiple data units, or
- when inputting said bitstream to a device operating on the basis of said second data structure standard, evaluating said second main overhead data and said second data unit overhead data of said data units, and decoding said encoded video data and decoding or processing, respectively, said encoded or non-encoded audio data, but not evaluating said first main overhead data and said first data unit overhead data of said multiple data units.

Advantageous additional embodiments of the inventive method are disclosed in the respective dependent claims.

In principle the inventive apparatus is suited for evaluating for the purpose of decoding a bitstream having a data structure fulfilling the requirements of a first data structure standard, the data of which bitstream include first main overhead data and multiple data units, each data unit containing first data unit overhead data according to said first data structure standard and encoded video data and encoded or non-encoded audio data, wherein said apparatus operates on the basis of said first data structure standard and wherein:

- said bitstream additionally includes second main overhead data such that said data structure of said bitstream fulfills also the requirements of a second data structure standard that is different from said first data structure standard;
- said data units additionally contain second data unit overhead data according to said second data structure standard;

said encoded video data and said encoded or non-encoded audio data are common to said first and second data structure standards, and wherein said apparatus includes:

means for inputting said bitstream;

means for evaluating said first main overhead data and said first data unit overhead data of said data units, and for decoding said encoded video data and decoding or processing, respectively, said encoded or non-encoded audio data, but not evaluating said second main overhead data and said second data unit overhead data of said multiple data units.

Either, the first data structure standard can be the DVD-Video standard and the second data structure standard the DVD_VR standard, or, the first data structure standard can be the DVD_VR standard and the second data structure standard the DVD-Video standard.

Advantageous additional embodiments of the inventive apparatus are disclosed in the respective dependent claims.

DRAWINGS

Figure 4:
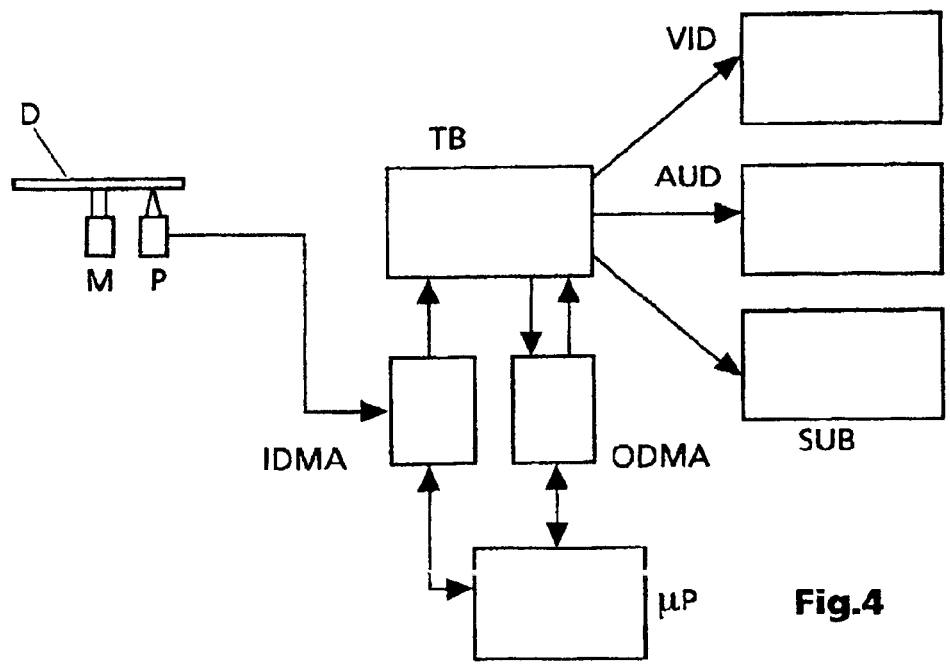

Exemplary embodiments of the invention are described with reference to the accompanying drawings, which show in:

FIG. 1 inventive data structure for a DVD-VR disc storing DVD-Video and DVD-VR data;

FIG. 2 structure of a bitstream on a disc according to FIG. 1;

FIG. 3 different structure of a bitstream for a disc according to FIG. 1;

FIG. 4 simplified block diagram of a DVD-Video or DVD-VR player.

EXEMPLARY EMBODIMENTS

As shown in FIG. 1, following Lead_In and File_Systems_Data two additional directories are inserted into the DVD-VR/Video root directory: VIDEO_TS for DVD-Video and DVD_RTAV for DVD-VR.

All necessary files for the two systems are generated:

for DVD-VR_MAGR.IFO, VR_MAGR.BUP, VR_AUDIO.VRO;

for DVD-Video_TS.IFO, VIDEO_TS.BUP and possibly VIDEO_TS.VOB.

However, the kernel AV stream (audio/video stream) that is described by the files VTS_xx_y.VOB for the DVD-Video system and VR_MOVIE.VRO and VR_STILL.VRO for the DVD-VR system, is the same bitstream, i.e. physically the DVD-Video and DVD-VR bitstreams are by only one stream.

To provide such feature the bitstream must have specific properties. Some of these properties are compelling, other properties are optional.

A corresponding bitstream structure as depicted in FIG. 2 is optimised with respect to compatibility with DVD-Video and DVD-VR. FIG. 2 shows that the DVD-VR video object units (VOBU) are shifted with respect to the DVD-Video object units: DVD-Video object units begin with a navigation pack NV_PCK whereas DVD-VR video object units end with a navigation pack NV_PCK that represents the beginning of the next DVD-Video object unit.

A navigation pack NV_PCK is followed by a real-time data information pack RDI_PCK, several video packs V_PCK, several subpicture packs SP_PCK, and several audio packs A_PCK. NV_PCK is used by DVD-Video only, RDI_PCK is used by DVD-VR only, V_PCK and SP_PCK and A_PCK are commonly used by DVD-Video and DVD-VR.

Mandatory properties are:

a) Navigation Packs NV_PCK must point in the stream to the beginning of each VOBU according to the DVD-Video standard, Part 3, Chapters 2.4.47, 4.6 and 5.2.2.

b) Real-time Data Information Packs RDI_PCK must point in the stream to the beginning of each VOBU according to the DVD-VR standard, Part 3, Chapters 2.4 and 5.4.4.

c) The MPEG Video stream must have such values for horizontal_size only that are allowed for DVD-Video as-well as for DVD-VR: 720, 704 and 352, but not 480 and 544 that are allowed in DVD-VR only, see DVD-Video standard, Part 3, Chapter 5.4.1.2 and DVD-VR standard, Part 3, Chapter 5.5.1.2.

d) In case an audio stream is to be accepted under DVD-VR for Still Picture (e.g. menus), it must have the stream number '1'. In case an audio stream is to be accepted under DVD-VR for normal video (i.e. not Still Picture), it must have the stream number '0' to keep compatibility with DVD-VR, see DVD-Video, Part 3, Chapter 5.2.4 and DVD-VR, Part 3, Chapter 5.3.3.

e) For Linear Audio streams (PCM streams) '0' and '1', quantisation_word_length=00b (16 bits) is to be used only to keep compatibility with DVD-VR, see DVD-Video, Part 3, Table 5.2.4-1, Note 8 and DVD-VR, Part 3, Table 5.3.3-1, Note 8.

f) For Linear Audio streams (PCM streams) '0' and '1', audio_sampling_frequency=00b (48 kHz) is to be used only to keep compatibility with DVD-VR, see DVD-Video, Part 3, Table 5.2.4-1, Note 9 and DVD-VR, Part 3, Table 5.3.3-1, Note 9.

g) To allow for DVD-Video and DVD-VR the common use of streams '0' or '1' for Linear Audio, only the values 0000b (mono) and 0001b (stereo) can be used for number_of_audio_channels, see DVD-Video, Part 3, Table 5.2.4-1, Note 10 and DVD-VR, Part 3, Table 5.3.3-1, Note 10. Alternatively, if for DVD-Video only PCM audio streams having a stream number greater '1' are used, then also the value 1001b (dual mono) for number_of_audio_channels of linear audio streams '0' or '1' can be used.

h) If a subpicture stream is to be handled under DVD-VR as well as DVD-Video, then it must have the stream number '0' to keep compatibility with DVD-VR, see DVD-Video, Part 3, Chapter 5.2.5 and DVD-VR, Part 3, Chapter 5.3.4.

From a) and b) it follows that no DVD-Video VOBU exists that starts with the same sector as a DVD-VR VOBU. Correspondingly, the same is true for each DVD-VR VOBU. Besides this, there exist sectors NV_PCK in the stream that are used only from a DVD-Video system and sectors RDI_PCK that are used only from a DVD-VR system, as mentioned above.

Optional properties are:

A) The use of audio streams having stream numbers >1. Such audio streams can be decoded by DVD-Video players only and may therefore fully match the DVD-Video standard specification, i.e. there is no limitation of allowed features due to DVD-VR requirements.

B) The use of subpictures having stream numbers >1. Subpicture streams having a stream number >0 can be decoded according to the DVD-Video standard only.

C) The use of audio streams having stream numbers >1. More than one audio stream may exist. However, audio stream numbers '0' and '1' must not co-exist in parallel in a DVD-VR VOBU in order to avoid conflicts with DVD-VR.

D) For Linear Audio (PCM) streams having stream numbers >1, the parameters quantization_word_length, audio_sampling_frequency and number_of_audio_channels may correspond to all possible values given in the DVD-Video standard DVD-VR. There is no limitation of-allowed-values due to DVD-VR requirements.

E) For audio streams having a stream numbers >1 all audio formats are allowed that are supported by the DVD-Video standard, e.g. DTS coding format. There is no limitation due to DVD-VR requirements.

F) The MPEG Video stream may use for horizontal_size the values 480 and 544 that are allowed for DVD-VR, if the corresponding video packs are used by DVD-VR VOBUs only, but not by DVD-Video VOBUs, see DVD-Video specification, Part 3, Chapter 5.4.1.2 and DVD-VR specification, Part 3, Chapter 5.5.1.2.

G) In user_data( ) fields in the picture layer of video streams teletext information corresponding to the DVD-VR specification may be contained. Such user data fields could contain for example subpicture information, the content of which subpicture information would be identical with the content of a second subpicture stream.

The bitstream structure depicted in FIG. 3 is more complex than that depicted in FIG. 2. In the VOBUs there are several additional subpicture and audio packs assigned to further stream numbers '1' to '4'. However, only the subpicture and audio packs that are assigned to stream '0' are used by a DVD-VR device. This specific bitstream structure is less compatible with DVD-VR, but emphasises the specific features of DVD-Video and DVD-VR.

In a further embodiment of the invention the kernel AV stream contains, beside the above described part common to DVD-VR and DVD-Video, a specific part or specific parts that are used for DVD-VR and DVD-Video only and to which the corresponding root directories, i.e. said first or second main overhead data, facilitate access.

FIG. 4 shows an optical disk D, which is driven by a motor M and from which data are read by means of a pick-up P. These data are fed in conditioned form, for example after amplification and error correction, to a track buffer TB via an input DMA (direct memory access) controller IDMA. The data are stored in buffer TB in order to compensate for instantaneous or short-term data rate variations. The corresponding partial data streams of the buffer-stored data stream are recopied from the track buffer TB in each case into an associated decoder: a video decoder VID for MPEG video data, an audio decoder AUD for MPEG or AC3 audio data, and a subpicture decoder for subpicture data. Such decoders require a dedicated bit buffer in order to access specific data in a specific order at specific time instants. Therefore, the data for a data decoder must be available in the output data stream in a combination and/or order that possibly differs from the input data stream. Since current device architectures may demand a decoder bit buffer comprising a single coherent memory area, the data initially stored in the track buffer can be re-copied into the bit buffer for the respective decoder by means of an output DMA controller ODMA in the required order and at the required time instant. IDMA, ODMA and other stages can be controlled by a common processor µP or by separate processors. In a DVD-VR player the subpicture decoder may be replaced by a teletext decoder. A DVD-VR recorder will additionally include corresponding video, audio and teletext encoders and means for writing encoded bitstream data on disc D.

The bitstream can be stored for example on a DVD-RAM or DVD-RW or DVD+RW or DVD-R or DVD-ROM disc, or can have the corresponding format.

Instead of a DVD disc, any other storage medium can be used. It is also possible to send a bitstream according to the inventive data structure from a transmitter to a receiver, which decodes the received bitstream according to one or the other DVD system type.

A further feature is to decode such received or replayed bitstreams according to both DVD system types, thereby using the particular features of the DVD-Video format, e.g. of having up to 32 sub-pictures, together with the particular features of the DVD-VR format, e.g. teletext.

The invention claimed is:

1. Method of assembling a decodable bitstream having a data structure fulfilling the requirements of a first data structure standard, the data of which bitstream include first main overhead data (VIDEO_TS) and multiple data units (DVD_Video VOBU, DVD_VR VOBU), each data unit containing first data unit overhead data (NV_PCK) according to said first data structure standard and encoded video data (V_PCK) and encoded or non-encoded audio data (A_PCK), wherein:
   said bitstream additionally includes second main overhead data (DVD_RTAV) such that said data structure of said bitstream fulfils also the requirements of a second data structure standard that is different from said first data structure standard;
   said data units (VOBU) additionally contain second data unit overhead data (RDI_PCK) according to said second data structure standard;
   said encoded video data (V_PCK) and said encoded or non-encoded audio data (A_PCK) are common to said first and second data structure standards.

2. Method according to claim 1, wherein said first data structure standard is the DVD-Video standard and said second data structure standard is the DVD-VR standard.

3. Method according to claim 1, wherein said data units (DVD_Video VOBU, DVD VR VOBU) additionally contain subpictute data (SP_PCK) that are common to said first and second data structure standards, which subpicture data can be evaluated and processed in devices operating on the basis of said first or on the basis of said second data structure standards.

4. Method according to claim 3, wherein said data units (DVD_Video VOBU, DVD_VR VOBU) contain additional encoded audio data and additional subpicture data corresponding to only said first data structure standard, which additional data can be evaluated and decoded or processed, respectively, only in said device operating on the basis of said first data structure standard.

5. Method according to claim 1, wherein said bitstream contains, beside said common encoded video data (V_PCK) and said common encoded or non-encoded audio data (A_PCK), a specific part or specific parts that correspond to said first or second data structure standard, respectively, to which specific part or parts only said first or second main overhead data, respectively, facilitate access.

6. Method according to claim 1, wherein said bitstream is stored on an optical disc (D), for example a DVD-RAM or DVD-RW or DVD+RW or DVD-R or DVD-ROM disc.

* * * * *